United States Patent [19]

Staples et al.

[11] 3,721,214
[45] March 20, 1973

[54] REMOVAL AND DISPOSAL OF MANURE FROM SUSPENDED CAGE CHICKEN HOUSES

[76] Inventors: William R. Staples, P.O. Box 147; Russell E. Staples, Rt. 3, Box 576; Wesley A. Staples, Rt. 3, Box 189, all of Palatka, Fla. 32077

[22] Filed: July 21, 1971

[21] Appl. No.: 164,743

[52] U.S. Cl. .................119/22, 198/213, 198/126, 214/42, 15/93 B
[51] Int. Cl. .............................................A01k 31/04
[58] Field of Search.......119/20, 22, 17, 18; 15/93 B; 198/126, 38, 213, 36; 214/42, 85

[56] References Cited

UNITED STATES PATENTS

| | | | |
|---|---|---|---|
| 3,662,420 | 5/1972 | Jordan | 15/93 B |
| 3,530,832 | 9/1970 | Satnick | 119/22 |
| 3,263,257 | 8/1966 | Stapleton, Sr. | 119/22 X |
| 3,343,521 | 9/1967 | Moores | 119/20 |

*Primary Examiner*—Aldrich F. Medbery
*Attorney*—Harold T. Stowell et al.

[57] ABSTRACT

A self-powered pitcher unit has an adjustably inclined pick up conveyor that picks up manure disposed in piles on the ground below the suspended cages of the middle rows in a chicken house, as the pitcher unit is pulled down the aisles between the outer and middle rows of cages by a small tractor, and transports the manure to a cross thrower conveyor operating from a hopper at the upper outlet end of the pick up conveyor with the manure being thrown out the open sides of the chicken house by the upwardly and outwardly inclined thrower conveyor onto a loader unit that is pulled along the outside of the house by a farm tractor in synchronized travel with the pitcher unit. The loader unit, which is mounted on a manure spreader and is driven by the power take-off on the tractor, has an inclined foldable platform onto which the manure is thrown and a conveyor carries the manure up the platform and drops it on an auger in advance of the spreader. Initially, the pitcher unit functions alone with a deflector hood on the thrower conveyor to transfer manure piles from under the outer rows to the middle rows of cages.

3 Claims, 19 Drawing Figures

INVENTORS
WILLIAM R. STAPLES,
RUSSELL E. STAPLES
and WESLEY A. STAPLES

By Stowell & Stowell
ATTORNEYS

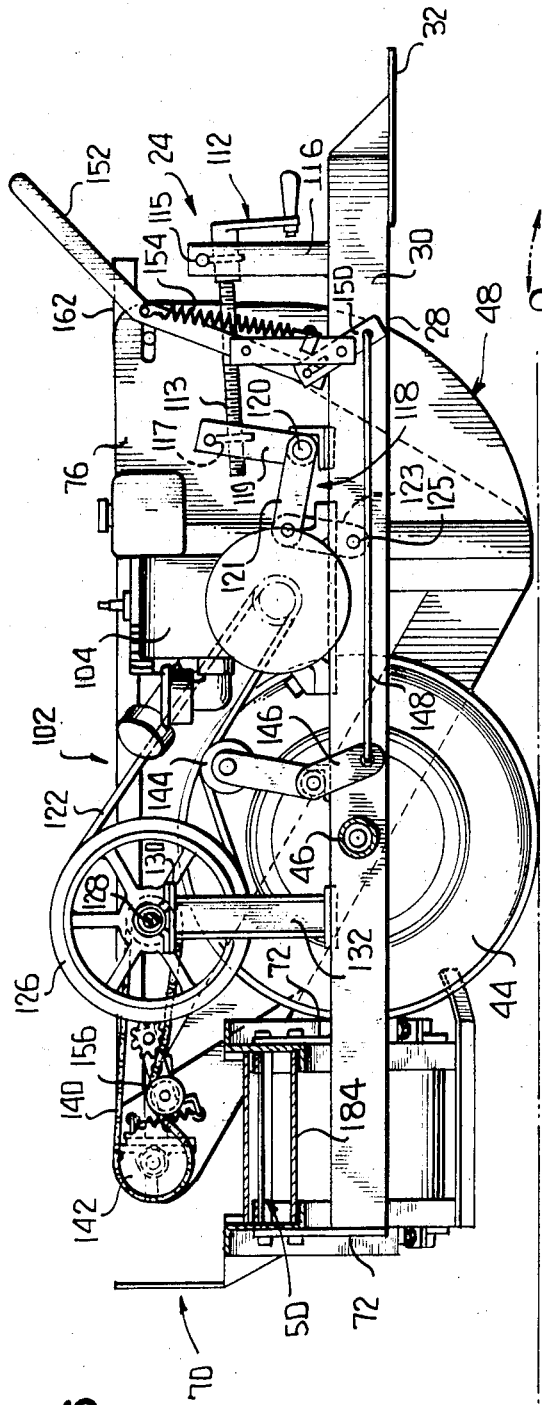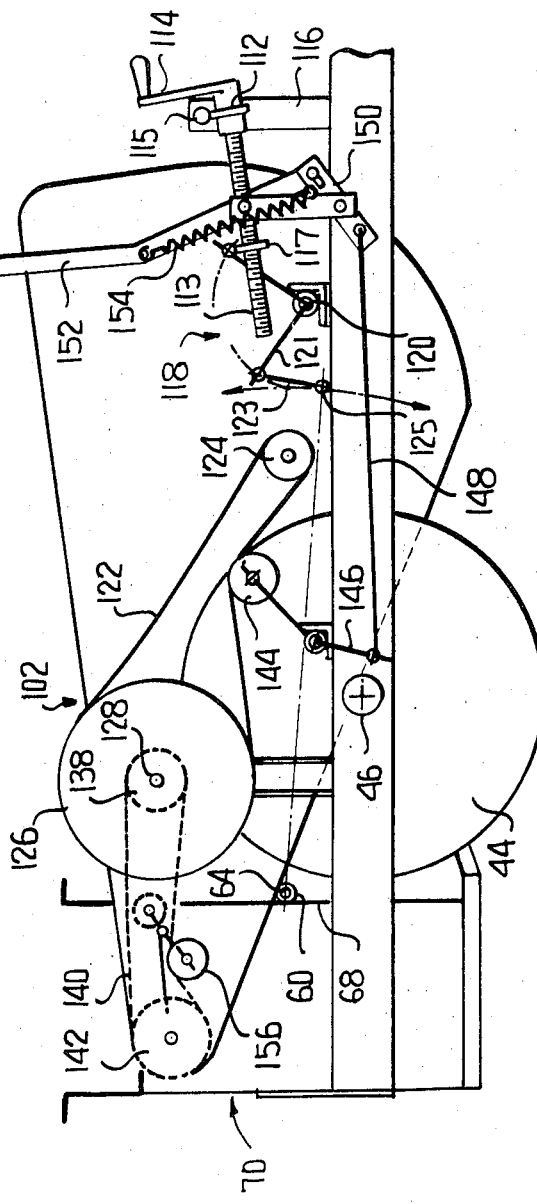
FIG.6
FIG.7
INVENTORS
WILLIAM R. STAPLES,
RUSSELL E. STAPLES
and WESLEY A. STAPLES
By Stowell & Stowell
ATTORNEYS

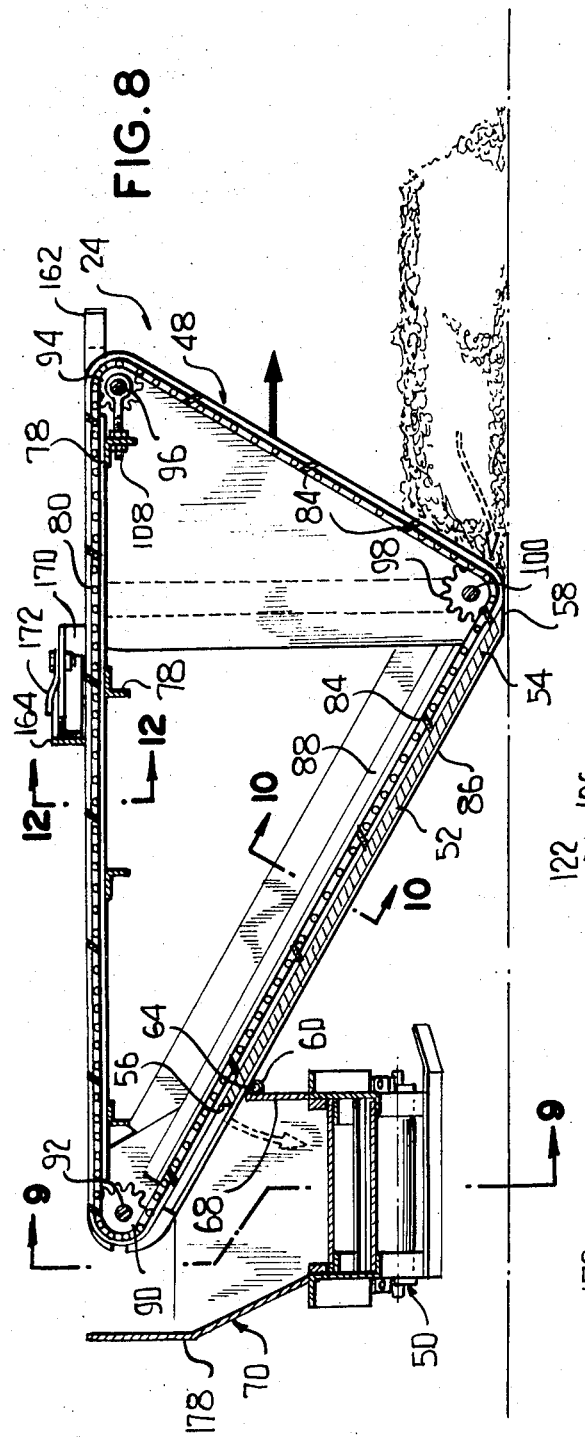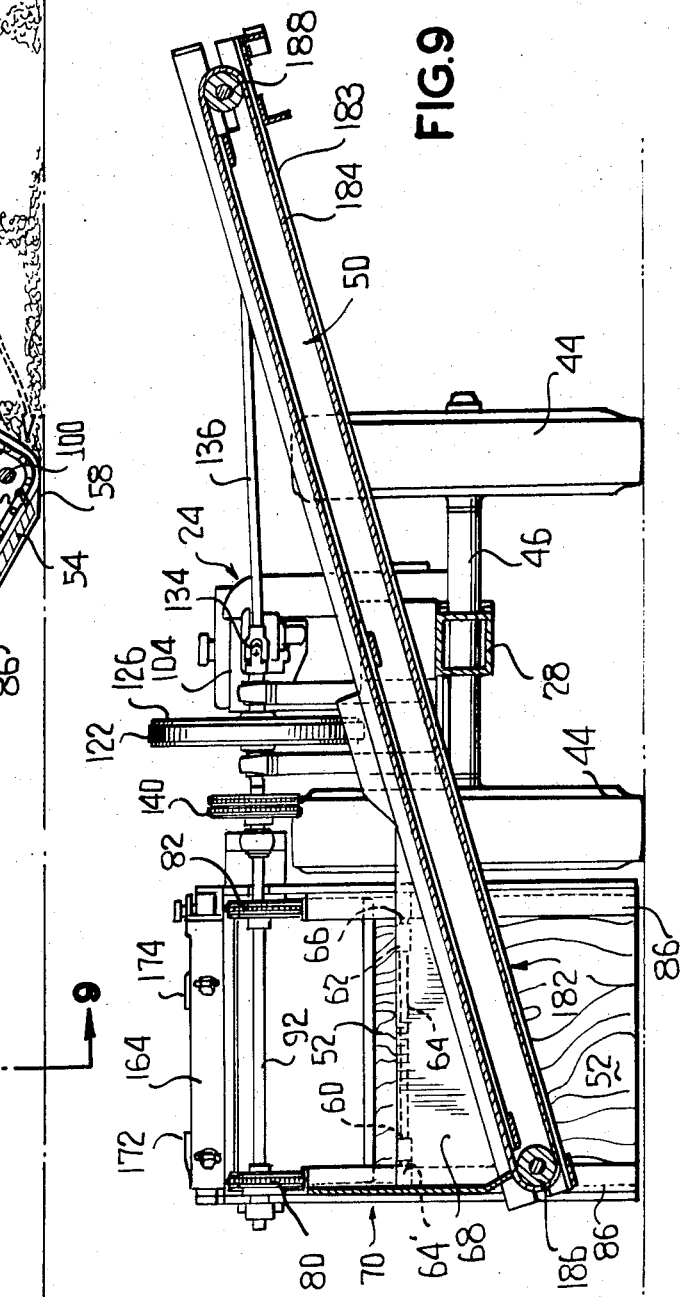

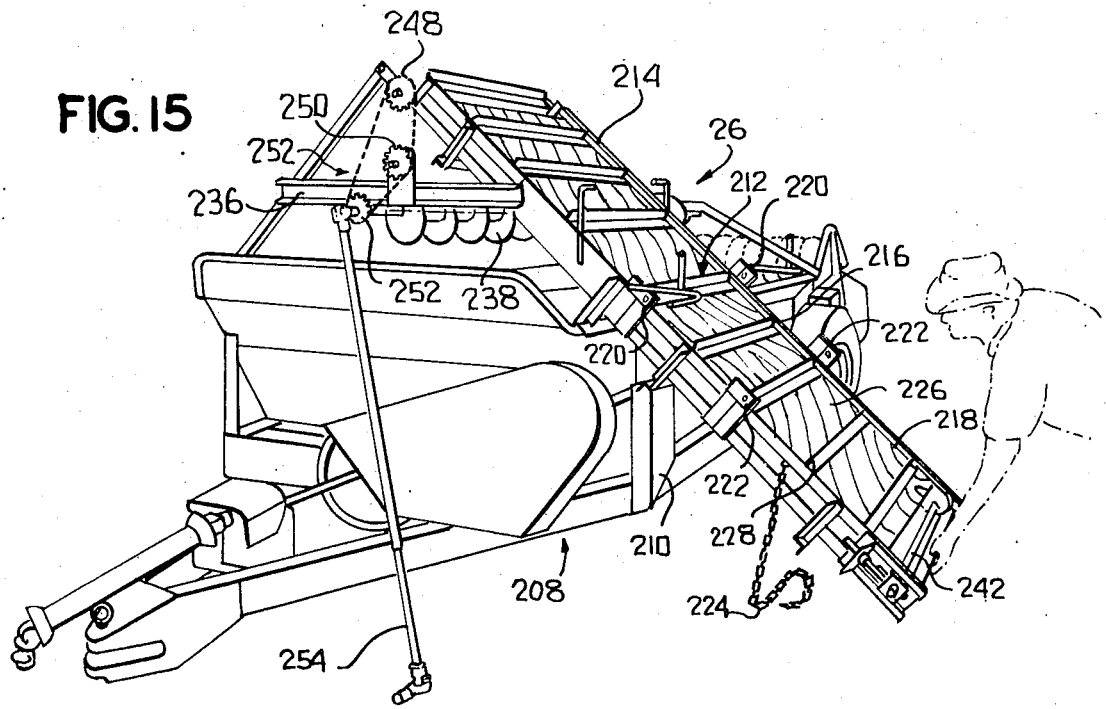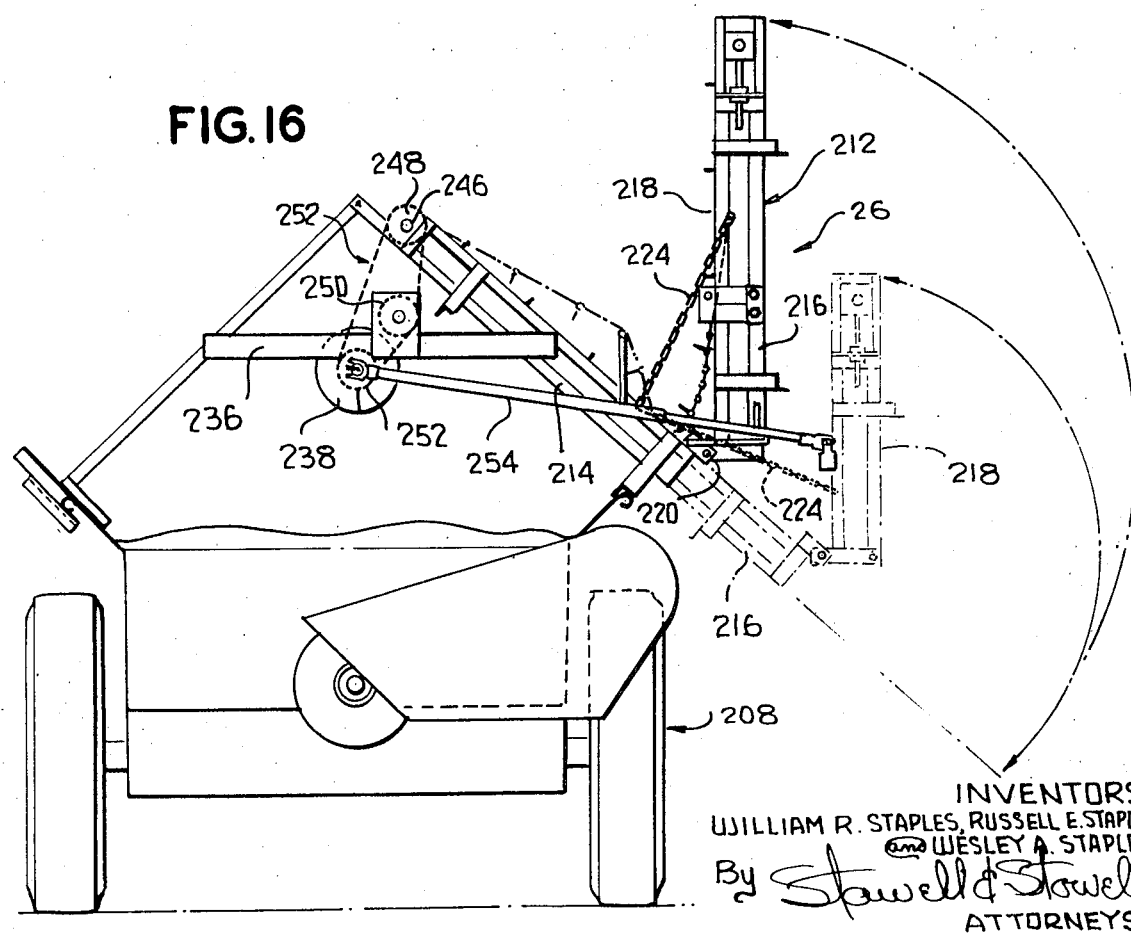

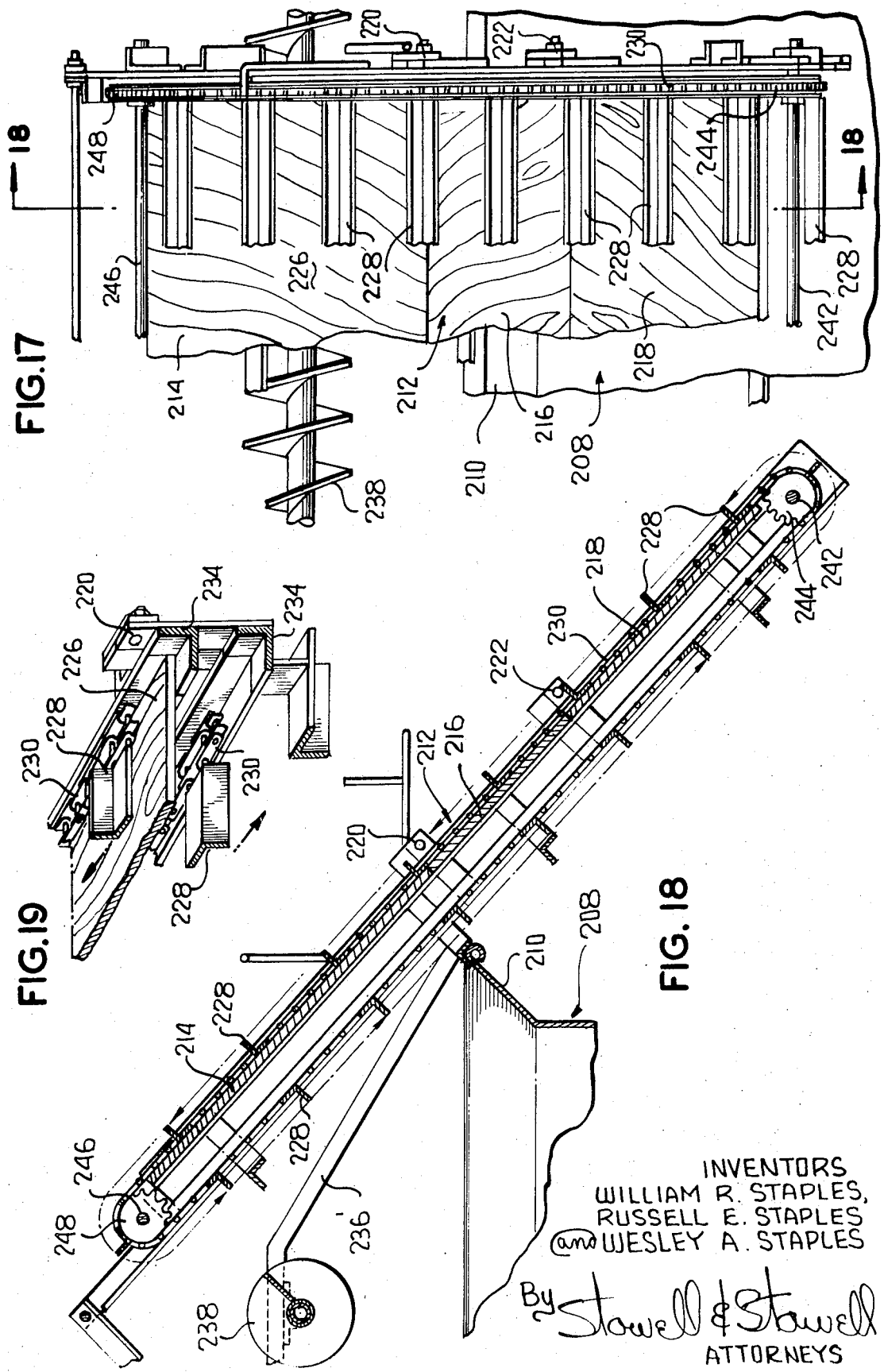

REMOVAL AND DISPOSAL OF MANURE FROM SUSPENDED CAGE CHICKEN HOUSES

BACKGROUND OF THE INVENTION

1. Field of the Invention

The present invention generally appertains to new and novel improvements in the field of poultry farming and more especially relates to a new and novel system designed for cleaning poultry houses in an expeditious and effective manner with the coordinated and combined disposal of the removed droppings by a manure spreader.

2. Description of the Prior Art

In the field of agronomics and especially in the raising and producing of livestock and poultry, the most complex present day problem facing farm owners is the ever increasing cost and yet associated scarcity of manual labor. Therefore, in every way technology is striving to eliminate or at least to reduce to a minimum the need for manual labor or, at best, the time and effort that must be expended by manual labor in performing certain farm tasks.

The problem that confronted the applicants was the removal of manure from chicken houses, especially suspended cage type chicken houses where suspended chicken cages are lined in longitudinal rows along the length of the house with the droppings piling up under the cages. Typically such a cage house is about 300 feet in length and about 14 feet in width. It is divided lengthwise into outer side rows of cages and double center rows of cages with longitudinal concrete aisles or walkways extending between the center rows and the outer side rows of cages. The cages are suspended from a roof supported structure and overlie the earth in vertically spaced fashion with the droppings from the chickens cooped up in the cages falling freely to the earthen ground below the cages and piling up over the course of months.

The dimensions and arrangements of cages in other type houses will vary but the problem is still basically the same. Such problem being the removal of the piles of droppings. In the past this chicken manure has been removed almost exclusively by manual labor. This is a dirty and tiresome job that requires in the typically described house the combined manual efforts of two men over a continuous 2½ day period of time. It is a manual task that usually is complicated by damage to the cages and to the concrete aisles and scooping up of earth with the droppings which necessitates the manual replacement of fill earth under the cages.

Over the past several years this need for manual labor to clean out the houses has become an increasingly frustrating and expensive problem for the chicken farmer due to the ever-rising cost and scarcity of manual labor, the increasing size and number of farms and the extreme unpleasantness of the task. Consequently, there has been a great need for a cleaning system that avoids the need for using people over any extended period of time and in a tiring and unpleasant manual way.

SUMMARY OF THE INVENTION

Having in mind the aforestated problem attendant with the presently practiced manual cleaning of chicken houses, it is a primary object of the present invention to provide a mechanized system whereby two people without any considerable physical effort can clean out a typically sized cage house in a complete and effective manner without damage to the cages, the aisles and the earth in approximately 1 hour of time with a slight additional amount of time being spent by one of the persons in the spreading of the removed manure over a pasture in a conventional spreading technique.

Commensurate with the foregoing object, it is another important object of the present invention to provide a simple and compact pitcher unit that is designed to be moved under the control of one person down the aisles of a chicken house in a way to pick up and thrown all the manure in the house out to the sides of the house where it is caught by a simple and compact catcher or loader unit on a spreader that is moved along the outside of the house under the control of a second person at the same rate of travel as the inside pitcher unit.

The pitcher unit is designed to be pulled down the concrete aisles by a conventional small lawn and garden tractor in the 10 to 12 horsepower range. The unit is attached to the tractor by a simple single pin hookup. It has its own engine so that it is entirely self-powered in its operation. The engine, which can be a small 10-15 horsepower motor, drives all of the working mechanism of the pitcher unit. Such mechanism is composed of a conveyor chain pick-up assembly which has a working reach that lies in adjustable inclined planes and has a lower end portion, that is adjustable and is designed so that it cuts through the manure piles in a controlled manner. The depth of the cut can be set from about 4 inches above the aisles or walkways to about 8 inches below. The adjustment mechanism is designed so that one person can position the pick up unit in the desired position for achieving the desired depth of slice or cut in the manure piles. The pick up conveyor is provided with a spring mounted floating feather shear that removes feathers which may have become wrapped about the cutting edges of the pick up conveyor. It is also designed so that the natural tendency of the manure to build up and interfere with the proper and efficient operation of the pick up conveyor is obviated.

The pitcher unit further includes a transverse or cross thrower conveyor disposed at the upper outlet end portion of the pick up conveyor and in free communication therewith so as to receive therefrom the picked up manure. The cross conveyor extends laterally from the pick up conveyor in the direction of one of the open sides of the cage house. It is inclined upwardly at an angle and is in the form of a rubberized belt so as to prevent any corrosion or build up problems and to allow the attaining of the relatively high throwing speeds in throwing the picked up manure from under the outer side cages onto the loader or catcher unit at one of the sides of the cage house.

Such loader or catcher unit is preferably but not necessarily attached to and operated in conjunction with a conventional manure spreader. It includes an inclined platform onto which the manure is thrown by the thrower conveyor of the pick up or pitcher unit. The manure is carried by this platform and dropped in the front of the manure spreader by a conveyor chain that travels along the platform. The manure is then moved to the rearwardly positioned spreader mechanism by a standard auger. The entire operation of the loader or catcher unit is effected by the power take-off on the farm tractor pulling the spreader.

In cleaning out a cage house, the manure piles under the outer side cages must be removed and deposited with the piles under the center row cages since the pick up or pitcher unit only can operate with the thrower conveyor in conjunction with the loader or catcher unit on and from the piles under the cages of the center rows. The cross thrower conveyor extends under the outer side row cages but passes inside of the house supporting vertical side posts and throws the manure from the center rows beneath the outer side row cages and onto the receiving platform of the catcher unit that is moving along the outsides of the cage house. Therefore, a deflector hood is mounted on the outer end of the cross thrower conveyor and the pick up unit is used alone and without the catcher or loader unit to clean the side row piles. The pick up unit is pulled down one of the aisles so as to pick up the manure under one of the outer rows of cages and deposit it under the center cages. This is then done to the other outer row with the pick up unit being pulled down the other aisle between the center rows and the opposite side row in the opposite lengthwise direction of the house. At this point all of the manure in the cage house is under the two center rows of cages.

The deflector is then removed from the cross thrower conveyor and a pass is made with the pick up or pitcher unit traveling in side by side operation with the catcher unit. The pitcher unit removes the manure from under one of the center rows of cages and throws it onto the loader or catcher unit which deposits it in the spreader. The pitcher unit is then pulled down the other aisle in the opposite longitudinal direction with the catcher unit moving along the outside of the opposite side of the cage house in synchronized movement.

All of the manure in the cage house is thereby removed from under the cages and loaded onto the manure spreader that is pulled out to pastures or other places and operated in the conventional manner. While it is felt that a manure spreader constitutes a more practical and feasible carrier for the loader or catcher unit, it should be noted that a truck or wagon could serve as the support for the loader unit which would then load the manure into such a carrier receptacle.

Thus it can be appreciated that another important object of the present invention is to provide a pick up or pitcher unit that can operate with ease and with a minimum of moving parts in an uncomplicated functioning manner to pick up manure from under suspended cages in a chicken house and throw the manure out the open sides of the house, such unit being easily adjustable and being self-powered and being pulled by a small tractor or similar towing vehicle under the control of a single operator.

Further, it can be appreciated that another important object of the present invention is to provide a loader or catcher unit that can be carried by a manure spreader and moved in synchronized side by side relation with the pitcher unit so as to catch the thrown manure and load the spreader therewith, such loader unit being double foldable for field or highway transport and having its own independent drive direct from the pulling tractor or similar vehicle under the control of a single operator.

Finally, as can be appreciated from the foregoing general description, the present invention overcomes the difficulties and drawbacks associated with present manual practices of cleaning manure from suspended cage type chicken houses and possesses all the features of a simple mechanized system for performing such task.

BRIEF DESCRIPTION OF THE DRAWINGS

FIG. 6 is a longitudinal vertical sectional view of such pitcher unit and is taken on line 6—6 of FIG. 5 to show the details of the pivotal mounting and adjustment of the unit about such transverse pivotal axis.

FIG. 7 is a diagrammatic illustration of the pivot axis and adjustment linkages shown in section and in side elevation in FIG. 6.

FIG. 8 is a longitudinal vertical sectional view taken on line 8—8 of FIG. 5 and showing the manure pile attacking operation of the pick up conveyor of the pick up or pitcher unit.

FIG. 9 is a transverse vertical sectional view taken on line 9—9 of FIG. 8 and showing the entire pick up or pitcher unit partly in rear end elevation and in vertical section and depicting the relationships of the rear upper delivery end portion of the pick up conveyor and the inner end of the laterially disposed thrower conveyor.

FIG. 15 is a perspective showing of the loader or catcher unit detached from the pulling tractor and illustrating the platform in its normal extended operational position.

FIG. 16 is an end elevational view of the unit of FIG. 15 with the double fold platform shown in its two positions of fold for highway and field transport.

FIG. 17 is a detailed fragmentary top plan view of the receiving platform and associated conveyor of the catcher or loader unit.

FIG. 18 is a vertical longitudinal sectional view of the platform of FIG. 17 and is taken on line 18—18 of FIG. 17.

FIG. 19 is a fragmentary detailed vertical sectional view of the mounting rail structure for the conveyor arrangement and platform of FIGS. 17 and 18.

DESCRIPTION OF THE PREFERRED EMBODIMENT

Figure 2:
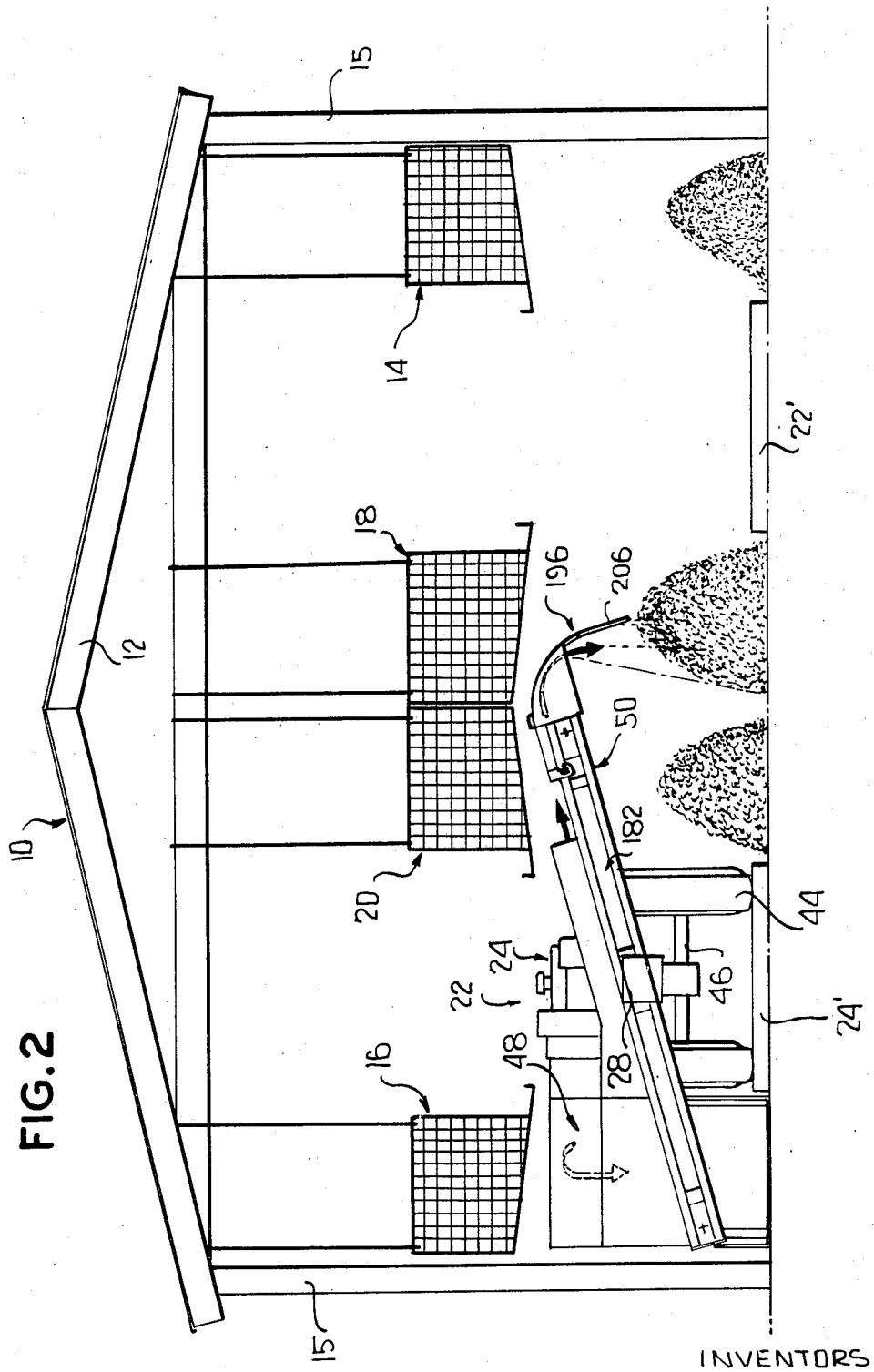
FIG. 2 is a transverse cross-sectional view of a typical suspended cage type chicken house and an end elevational view of the pick up unit with the deflector hood attached to the outer end of the thrower conveyor and illustrating how the manure from under the outer side rows of cages is picked up and transferred to the manure piles under the center rows of cages.

Referring now more particularly to the accompanying drawings and initially to FIG. 2 for an understanding of a typical suspended cage chicken house, generally indicated by reference numeral 10, it can be seen that such typical cage house 10 is of elongated rectangular shape being of a size of about 300 feet in length and about 14 to 15 feet in width. The cage house 10 has a roof 12 that is supported by posts 15 spaced every 7 feet along the sides. The roof supports suspended cages that are lined in outer side rows 14 and 16 and dual center rows 18 and 20. The outer row 14 is separated from the closer center row 18 by a longitudinal concrete aisle or walkway 22' while a similar aisle or walkway 24' separates the other side row 16 from the center row 20. The cages in all of the rows are suspended above the underlying ground earth on which droppings from chickens cooped up in the cages fall so that the droppings form, over the course of months, piles of manure under the cages, as depicted in FIG. 2.

The cleaning system of the present invention involves the utilization in synchronized fashion by two workmen of a mechanism 22 which is composed in the main of a pick up or pitcher unit 24 and a loader or catcher unit 26.

The pitcher unit 24 includes a longitudinal tubular beam 28 which has a front end portion 30 that carries a coupling tongue 32 having a vertical opening 34 to receive a coupling pin 36 which attaches to the hitch bar 38 on a conventional lawn and garden tractor 40. Such tractor is of a small size, generally in the ten to twelve horsepower range.

The beam 28 provides a frame which is supported adjacent its rear end portion 42 by ground engaging wheels 44 carried by an axle assembly 46 that is transversely supported by the beam end portion 42. The wheels 44 are disposed so that they track with the tractor wheels and they cooperate with the rear wheels of the tractor in providing movable ground support for the frame 28 and the entire pick up unit assembly which is supported thereby.

The pitcher unit 24 further includes a pick up conveyor 48 and a cross thrower conveyor 50 with the pick up conveyor being disposed parallel with the frame beam 28 and lying along the inside thereof while the thrower conveyor 50 is transverse to the frame beam and is disposed at the rear end portion thereof and lies transversely behind the pick up conveyor.

Figure 5:
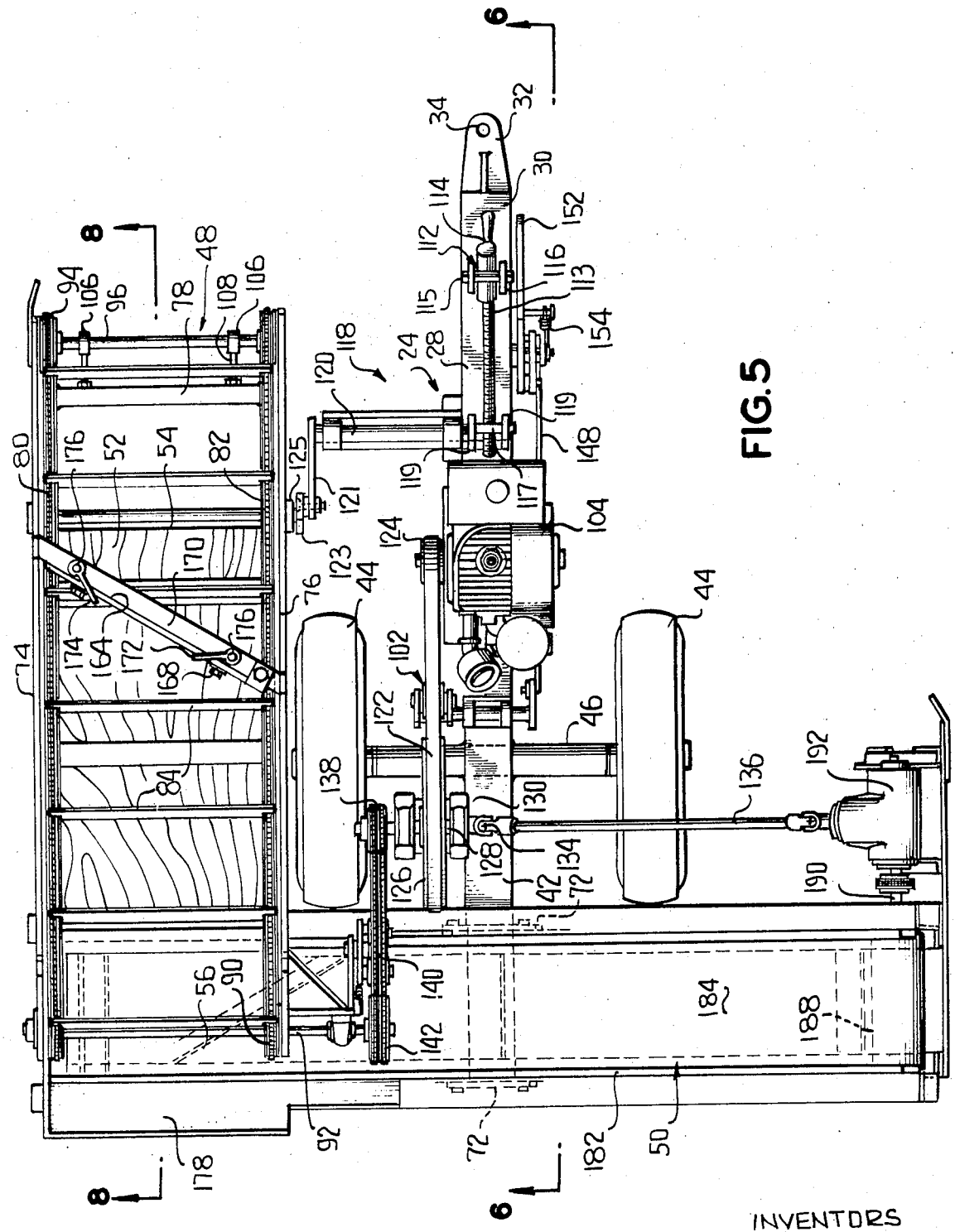
FIG. 5 is an enlarged top plan view of the pick up or pitcher unit.

The pick up conveyor includes a scoop plate or board 52, as more clearly shown in FIG. 8, with such board being wooden or metal or the like and lying in an inclined plane so that it has a lower end portion 54 and an upper end portion 56. The lower end portion terminates in a beveled shovel type lip 58. The board carries on its underside, as shown in FIGS. 8 and 9, adjacent its upper end a pair of transversely aligned journal sleeves 60 and 62. The journal sleeves which are disposed at the side edges of the board receive a single journal pin 64 that is also received by the outer sleeves 64' and 66 adjacent the front side 68 of the rear receiver hopper 70 for the cross conveyor 50 and which constitutes a supporting frame for the two conveyors and is fixed by a mounting bracket assembly 72 to the rear end portion 42 of the frame beam 28, as shown in FIGS. 5 and 6.

The pick up conveyor 48 further includes opposing vertical side frame 74 and 76 between which the conveyor runs with the side frames being interconnected by cross bars 78 to form a rigid supporting framework for a pair of endless link chains 80 and 82. The chains run along the inner faces of the vertical side frames and have blades 84 extending transversely therebetween with the reduced ends of the blades being fixed to selected spaced apart links of the chains as shown in FIGS. 5 and 10.

Figure 10:
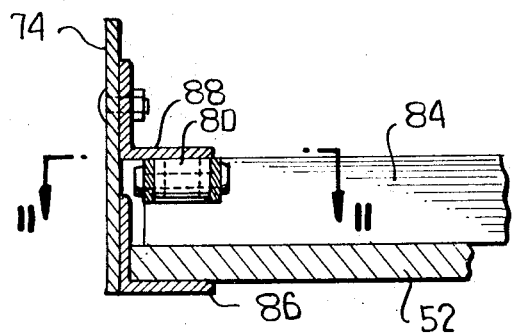
FIG. 10 is a detailed vertical cross-sectional view taken on line 10—10 of FIG. 8 and showing in detail the manner in which the pick up chain is held against the wooden pick up platform by hold down rails at each side of the platform.

The scoop or pick up plate 52 is supported by angle irons 86 carried by the side frames, as shown in FIG. 10, and the chains are held down by hold down rails 88 at each side frame, as shown in FIGS. 8 and 10, so as to prevent any manure on the upper working face of the plate 52 from building up under the chains and causing them to break.

The chains are guided in a triangular pattern, as shown in FIG. 8 by upper rear sprockets 90 on a drive shaft 92 and upper front sprockets 94 on an idler shaft 96 and by lower sprockets 98 mounted on a pair of idler shafts 100. The rear shaft 92 is driven by a belt transmission means 102, as shown in FIGS. 6 and 7 and as will be described, from a small conventional gasoline engine 104 mounted on the frame beam 28 and also supplying the motive power, as will be described, for the cross thrower conveyor 50.

The rear drive shaft 92 is supported in not adjustable bearings and, similarly, the forward idler shaft 96 is supported by set collars 106 that are carried by adjustable arms 108 from a cross bar 78. The upper idler shaft 96, as shown in FIG. 8, lies a considerable distance forward of the lower idler shafts 100. Also, in this regard, it will be noted from FIGS. 5 and 8, that the blades or slats 84 are mounted at an angle between the chains so that they are inclined forwardly in the front reaches of the chains and are inclined upwardly and forwardly as they pass over the upper working face of the plate or board 52, as shown in FIG. 8. This causes each blade or slat 84 to slicingly come into contact with the top of the manure pile, as can be seen in FIG. 8, and cut off a slice from the pile causing it to fall on the upper working face of the plate 52 along which the blades carry the manure until it is dumped into the receiver bucket 70, as will be described.

The pick up conveyor is mounted, as aforedescribed, so that it can be pivoted about the transverse pivotal axis defined by the journal sleeves 60, 62', 64' and 66 and the journal pin 64. Such pivot axis is transverse to the conveyor and to the beam 28 along one side of which the pick up conveyor lies. In this regard, as can be appreciated from FIGS. 1 and 5, the pick up conveyor is spaced laterally from the frame structure so that it moves in alignment with the manure piles under the center rows of cages as the wheeled frame tracks after the towing tractor 40 moving on one of the concrete walkways or aisles. The conveyor can be adjusted about its pivot axis to control the placement of the lower end and, consequently, the depth of cut can be set from about 4 inches above the walkways to about 8 inches below the walkways. Also, in this respect, the chains travel over the upper surface of the plate 52 so that the underside can be lowered directly into contact with the ground and, therefore, provide a cleaner job, as can be appreciated from FIG. 8 since the shovel edge 58 is scraping below the pile as the blades are cutting into the pile from the top. This arrangement also assists in propelling of the device as the cutter members pull the loader into the manure pile during the cutting action of the blades.

The mounting of the pick up conveyor is such that it is balanced in a fashion enabling one man through the easy operation of an adjustment means 112 to raise or lower the lower end thereof. The adjustment means 112 includes a hand crank 114 carried by a post 116 on the front end portion 30 of the frame beam 28 and the crank rotates a lead screw 113 adapted to pivot about its pivotal connection 115 to the post 116. A threaded follower 117 is pivotally carried between a pair of lever arms 119 the lower ends of which are secured to the outboard end of cross shaft 120. The other end of cross shaft 120 has secured thereto and for movement therewith a lever 121. Lever 121 pivotally mounts a link 123 the lower end of which is pivoted to the main frame of the pick up conveyor at 125 whereby upon rotation of lead screw 113 the leading end of the pick up conveyor is raised or lowered depending upon the direction of rotation of the crank.

The drive transmission means 102 between the engine 104 and the drive shaft 92 for the pick up conveyor includes a main belt 122 connected between a pulley 124 on the motor shaft and a large pulley 126 carried by a stub shaft 128 which is mounted in bearings 130 on support posts 132 anchored on the frame beam 28. The stub shaft has one end connected by a universal coupling 134 with a drive rod 136 for the cross thrower conveyor 50, as shown in FIG. 5, and an inner end carrying a sprocket 138. The sprocket 138 is connected by a chain 140 to a sprocket 142 on the projecting end of the drive shaft 92, as shown in FIG. 5.

Since the angular adjustment or position of angular tilt of the entire pick up conveyor 48 will have an effect on the chain transmission mechanism by producing slack therein at certain times, it is necessary to provide chain tighteners. As shown in FIGS. 6 and 7, the main belt 122 is provided with a clutch pulley 144 carried by a pivoted crank arm 146 which is actuated by a rod 148 extending lengthwise of the frame and connected to an operating throw arm linkage 150. Such throw arm linkage 150 is actuated by a handle 152 with a hold spring 154 being connected between the linkage and the handle so as to hold the linkage in the engaged and disengaged positions. The chain 140 is provided with a regular crank type chain tightener 156, as shown in FIGS. 6 and 7.

Figure 1:
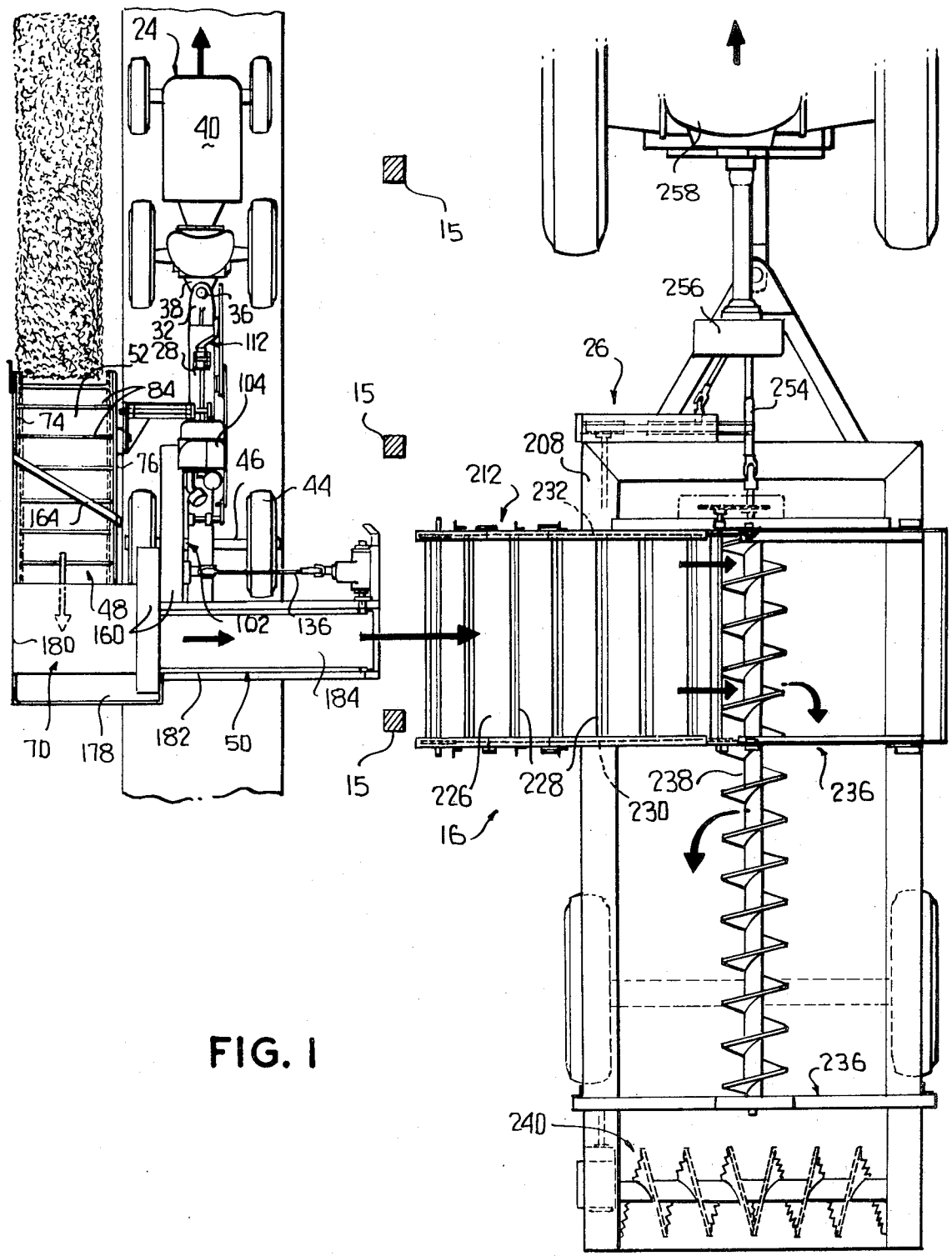
FIG. 1 is a top plan view of the pitcher unit and the catcher unit showing the same in synchronized side by side operation in carrying out the mechanized system of the present invention for cleaning manure from suspended cage type chicken houses.

The rear end portion of the pick up conveyor above the hopper 70 is covered with a shield 158 and cover shields 160 are provided for the belt transmission means, as shown in FIG. 1. Also the left side frame has an upper forwardly projecting and inwardly curved chain guard 162.

Figure 12:
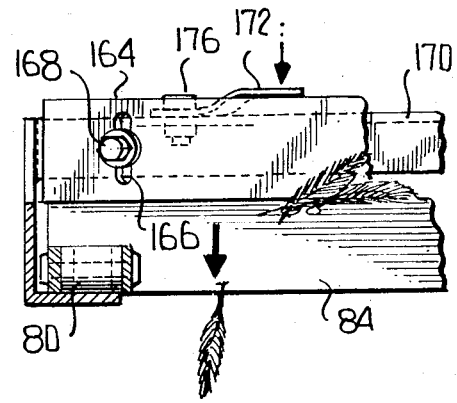
FIG. 12 is a detailed vertical cross-sectional view taken on line 12—12 of FIG. 8 and showing in detail the spring floating mounting arrangement for the feather shear.
Figure 11:
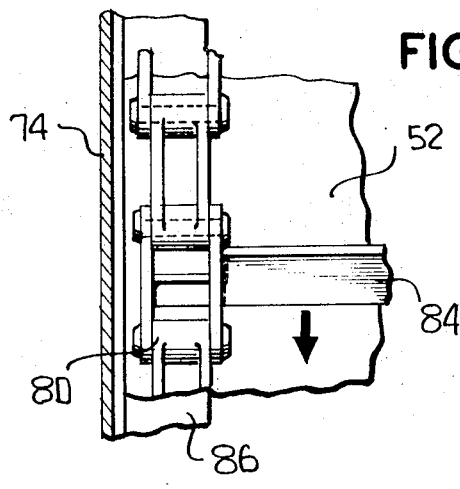
FIG. 11 is a detailed horizontal cross-sectional view of the mounting arrangement shown in FIG. 10 and is taken on line 11—11 of FIG. 10.

There is a tendency for the slats or blades 84 to pick up adhering feathers and to remove the feathers a spring loaded feather shear 164 is provided as shown generally in FIGS. 5 and 8 and more specifically in FIG. 12. The feather shear is vertically disposed diagonally across the top of the pick up conveyor and has vertical slots 166 which receive guide bolts 168 carried by a mounting bar 170 which is fixed across the top edges of the side frames 74 and 76. A pair of leaf spring fingers 172 and 174 are fixed by bolts 176 on the mounting bar 170 and overlie the shear bar to provide a floating hold down action in urging the shear bar against the blades as they move over the top reach before approaching the downward and rearwardly cutting reach.

The receiver hopper 70 has a rear wall 178 that extends higher than the front wall 68 to which the pick up conveyor is pivoted. It also has an outer side or end wall 180 from which a chute like housing 182 extends upwardly and outwardly and in which the cross thrower conveyor travels. Such housing is composed of a set of inturned lower angle irons 183 and a set of out turned upper angle irons 185. The side edges of the lower reach of the belt travels on the inturned flanges of the lower angle irons while the side edges of the upper working reach of the belt are engaged under hold down bars 187 that cooperate with the upper set of angle irons. Such conveyor is in the form of a rubberized endless belt 184 that travels around an inner idler roller 186 and an outer drive roller 188. The belt, as shown in FIG. 9, starts as the bottom of the hopper and is inclined upwardly and outwardly laterally of and projecting beyond the frame structure and the towing tractor. The thrower conveyor structure is disposed so that it underlies the cages of the outer side rows, as shown in FIG. 3, but terminates at a line just inside the side posts 15 of the cage house 10, as shown in FIG. 3.

Figure 13:
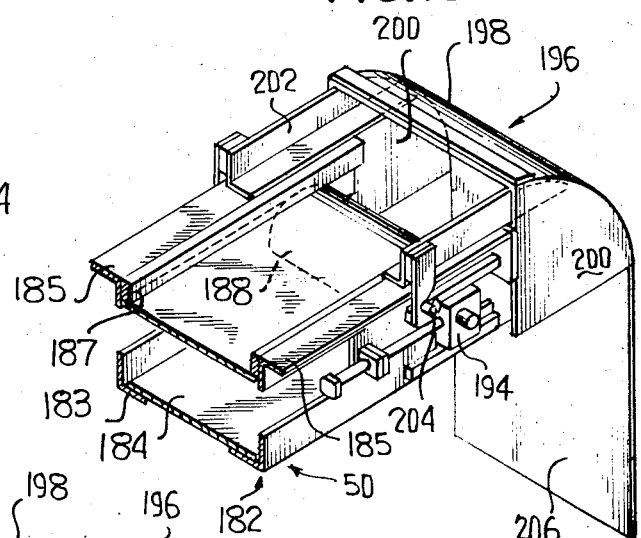
FIG. 13 is a perspective view of the outer discharge end of the thrower conveyor with the deflector hood mounted thereon.

The use of the rubberized belt 184 prevents corrosion and avoids any manure build up problems that would be inherent in using a chain. Further it allows the relatively high speed without slippage necessary to throw the manure from the hopper under the outer cages onto the loader unit 26, as shown in FIGS. 1 and 3. The outer drive roller 188 is carried by a shaft 190 that is connected through a gear box 192 with the outer end of the drive shaft 136. The roller shaft is carried by adjustable bearings 194 so that the belt can be tightened, as shown in FIG. 13.

Figure 3:
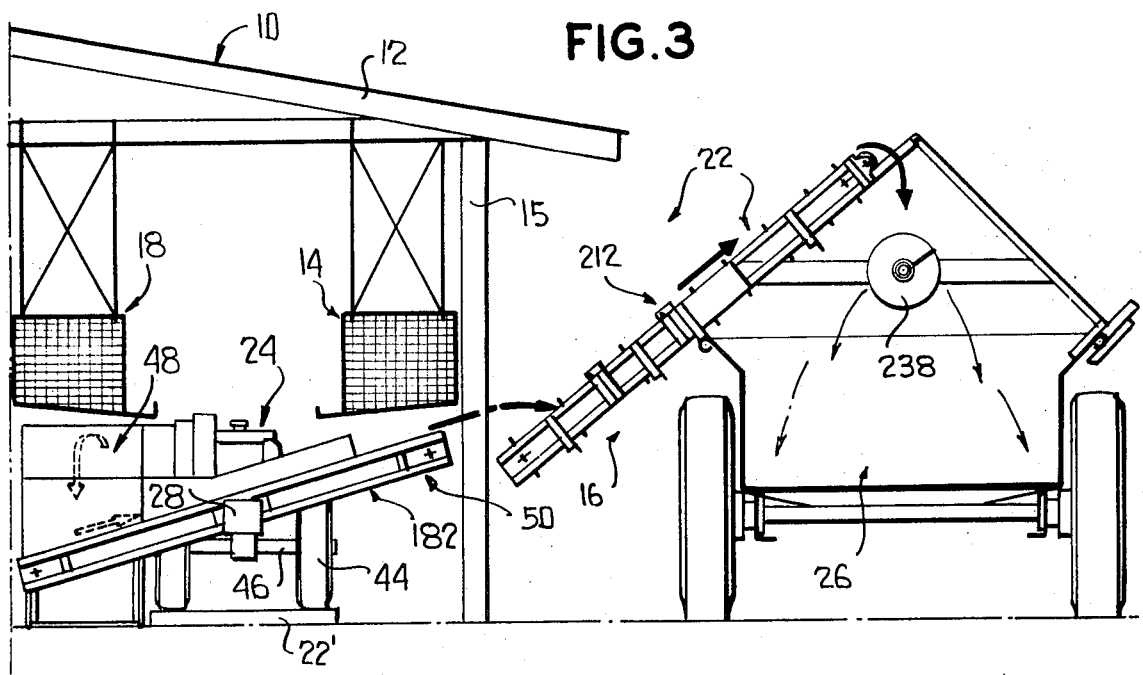
FIG. 3 is an end elevational view of one half of the cage house and an end elevational showing of the coordinated moving pick up or pitcher unit and the loader or catcher unit, with such units being shown in operation for picking up the manure under one of the center rows of cages.

In the use of the mechanism 22, as shown in FIG. 3, which is after the piles of manure under the outer rows of cages have been picked up and deposited with the center rows of manure, the pitcher unit 24 is pulled down the aisle 22 and the manure under the center row 18 is picked up by the pick up conveyor 48 dumped into the hopper 70 onto the belt 184 and carried thereby to the outer end of the chute like housing 182 and thrown by the belt as it starts around the roller 188 out through the open side of the cage housing 10 onto the catcher unit 16, which will be more particularly described.

Figure 14:
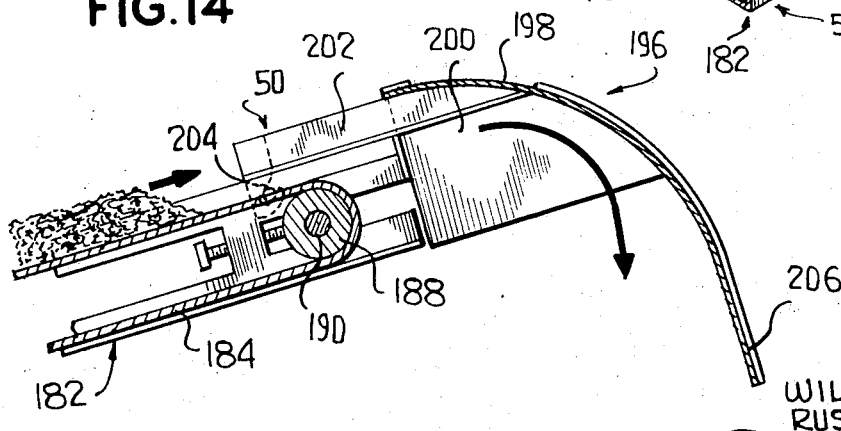
FIG. 14 is a side elevational view of the deflector hood assembly shown in FIG. 13.

However, before this step of the operation takes place, which step is repeated in the opposite longitudinal direction of the cage housing with the pitcher unit 24 moving in the reverse direction on the aisle 24' and the catcher unit moving in the reverse direction along the opposite side of the house, it is necessary for the piles of manure under the cages in the outer rows 14 and 16 to be picked up and deposited on the center piles. In performing this step of the operation the catcher unit 26 is not used and the pitcher unit is used alone with a deflector hood 196, as shown in FIGS. 13 and 14, attached to the outer end of the thrower conveyor 50.

The deflector hood 196 has an arcuate body portion 198 with straight side walls 200 carrying rearwardly extending arms 202 that are fixed on the side flanges of the upper angle irons 185 by bolt assemblies 204 so that the body portion somewhat spacedly overlies and confronts the outler end of the belt 184. The body portion has a depending skirt 206 that is spaced from the roller 188 and extends down well below it, as shown in FIG. 14.

The use of the pitcher unit 24 with the deflector hood on the outlet end of the thrower conveyor 50 is quite apparent from FIG. 2 wherein it will be seen that the manure from the side row pile thrown by the thrower conveyor 50 will impinge on the inside of the hood and be deflected thereby downwardly to build up on the center row piles.

Figure 4:
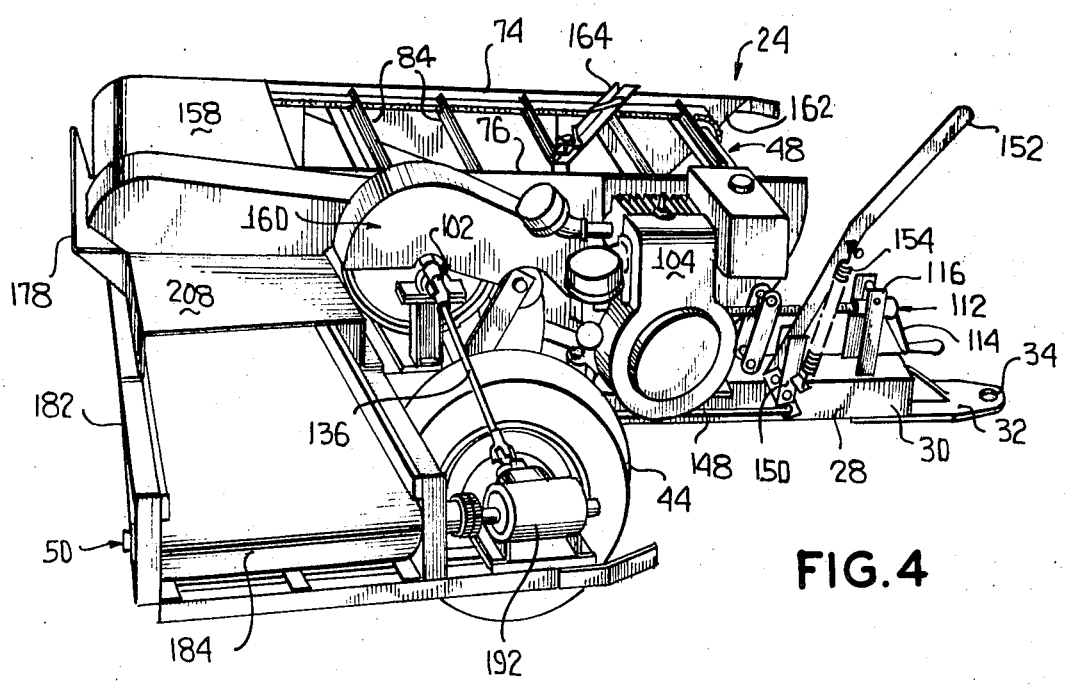
FIG. 4 is a perspective showing of the pick up or pitcher unit.

The upper reach of the belt 184, especially at its portions beyond the hopper shield 158 and just inwardly of the outer discharge end, is covered by a shield 208, as shown in FIG. 4.

The loader or catcher unit 26, as shown more clearly in FIGS. 15-19, includes a mobile receptacle 208 which is shown as a conventional manure spreader but which could be a drafted or self-propelled truck or wagon. Attached to one side of the spreader body 210 is a sectional platform 212 that is formed of three sections, a fixed upper section 214, a hinged foldable center section 216 and a hinged foldable lower section 218. When the sections are unfolded into alignment the entire platform lies in an inclined position with its center and lower aligned sections extending outwardly from and below the body 210, as shown in FIG. 3. In such position the lowermost section lies adjacent to and below the outer discharge end of the thrower conveyor 50 of the pitcher unit 24, as shown in FIG. 3.

The platform has the double fold arrangement for easy field and highway transport and the hinge construction is such that one man, as shown in FIG. 15, can fold and unfold the sections. The fixed upper section 214 has its lower end fixed to the body while the adjoining upper end of the center section is hinged thereto by a folding hinge 220 that permits the ends to abut each other in their unfolded state. A similar folding hinge 222 connects the adjoining ends of the center and outer or lower section. It will be noted that each pair of hinges 220 and 222 is of the "over center" type so that when the conveyor is in the operative position conveyor chain tension tends to maintain the conveyor frame in the straight line position.

In the one position of fold, as shown in full lines in FIG. 16, a chain 224 connects between the fixed upper section and the outer section to hold the center and outer sections in an upward position while in the second fold position, as shown in dotted lines in FIG. 16, the lower section is held in the vertical position by chain 224.

The platforms have outer working faces 226 over which angle iron slats 228 pass in transporting the caught manure up the faces to the top end of the fixed upper section. The slats have their opposing ends connected to selected links of a pair of chains 230 and 232 that guidingly travel in rails 234.

A framework 236 supports an auger 238 that is mounted on sealed bearings carried by the framework. The auger is positioned below and parallel with the top end of the upper section so as to receive therefrom the caught manure and deliver it to the rear of the spreader which has a conventional spreader assembly 240 at its rear end. Preferably the framework 236 is designed such that the auger 238 is positioned at a height above the upper side walls of the spreader equal to the normal angle of repose of the chicken manure. In this way the spreader receives a maximum load of manure.

The catcher unit has an independent drive that does not interfere with the spreader operation. Such drive includes an idler shaft 242 with sprockets 244 journaled at the outer end of the lower section 218 and a drive shaft 246 with chain engaging sprocket 248 journaled at the top of the fixed upper section 214. A chain sprocker idler 250 is provided from the auger 238, as shown in FIG. 15, via chain drive 252 including drive sprocket 252'. Such drive 252 is connected to and powered by a drive shaft 254 which is adapted to be coupled to the power take-off 256 of the drafting farm tractor 258, as shown in FIG. 1. The shaft 254 also drives the auger 238.

After the cage house 10 has been cleaned in a way that is believed obvious in view of the foregoing description and in the light of the drawings, the platform is folded up and the drive shaft 254 disconnected. The spreader then can be hauled to pastures for conventional spreading of the manure.

While the best known form of the system and mechanism of this invention has been disclosed herein such is merely exemplary in nature since the Abstract is not limitative and the specification and drawings are merely by way of example with the invention being limited only by the scope and spirit of the appended claims.

What is claimed is:

1. The method of cleaning manure from a suspended cage type chicken house having a roof structure supported by opposing longitudinal sets of vertical posts and cages suspended from the roof structure in spaced relation to the ground earth with the cages laid out in lengthwise outer side rows just inside the vertical support posts and in center rows spaced laterally from the side rows by longitudinal aisles comprising the steps of:

a. mechanically removing piles of manure from under the cages in the side rows and transfering the manure to the piles under the cages in the center rows;
b. passing a pick up conveyor down the center rows to pick up the manure;
c. continuously throwing the picked up manure with a lateral thrower conveyor to the outside of a side of the cage house, and,
d. catching the thrown manure on a catcher unit traveling along the outside of the side of the cage house in synchronized side by side relation with the pick up conveyor.

2. The method of claim 1 wherein said catcher unit is carried by a carrier receptacle into which the catcher unit loads the thrown manure as it catches it.

3. The method of claim 1 wherein said pick up conveyor is passed down an aisle so that the picked up manure is thrown out one side of the cage house and then is passed down the other aisle in the opposite direction so that the picked up manure is thrown out the other side of the cage house with the catcher unit traveling along on opposite sides of the cage house in accordance with the lateral direction in which the manure is being thrown.

* * * * *